United States Patent [19]

Fulger et al.

[11] Patent Number: 4,710,386

[45] Date of Patent: * Dec. 1, 1987

[54] ALL NATURAL, READY-TO-EAT ENZYME-SACCHARIFIED CEREAL DERIVED FROM WHOLE CEREAL GRAIN

[75] Inventors: Charles V. Fulger, Katonah; Ernest K. Gum, Granit Springs, both of N.Y.

[73] Assignee: General Foods Corporation, White Plains, N.Y.

[*] Notice: The portion of the term of this patent subsequent to Feb. 14, 2001 has been disclaimed.

[21] Appl. No.: 696,665

[22] Filed: Jan. 29, 1985

[51] Int. Cl.$^4$ .................. A23L 1/10; A23L 1/164; A23P 1/00

[52] U.S. Cl. .................. 426/28; 426/619; 426/620; 426/622; 426/462; 426/463; 426/466; 426/516; 426/518

[58] Field of Search .................. 426/18, 20, 21, 28, 426/49, 52, 518, 436, 479, 443, 457, 459, 460, 462, 463, 466, 516, 620, 621, 622, 619, 464, 615; 435/99

[56] References Cited

U.S. PATENT DOCUMENTS

| | | | |
|---|---|---|---|
| 897,854 | 9/1908 | Schlüter | 426/463 |
| 2,289,416 | 7/1942 | Fine et al. | 426/28 |
| 3,458,321 | 7/1969 | Reinhart et al. | 426/463 |
| 3,788,861 | 6/1971 | Durst | 426/463 |
| 3,958,016 | 6/1976 | Galle et al. | 426/18 |
| 4,254,150 | 3/1981 | Fritze et al. | 435/99 |
| 4,282,319 | 8/1981 | Conrad | 426/18 |
| 4,311,714 | 1/1982 | Goering et al. | 426/52 |
| 4,431,674 | 2/1984 | Fulger et al. | 426/18 |
| 4,500,558 | 2/1985 | Fulger et al. | 426/622 |

FOREIGN PATENT DOCUMENTS 1561190 2/1980 United Kingdom ............ 426/516

*Primary Examiner*—Thomas G. Wiseman
*Assistant Examiner*—Elizabeth C. Weimar
*Attorney, Agent, or Firm*—Thomas A. Marcoux; Thomas R. Savoie; Daniel J. Donovan

[57] ABSTRACT

A process for producing an all natural, enzyme-saccharified, cereal derived from whole grain is disclosed. The process involves milling and separating the whole grain to produce a bran fraction, an endosperm fraction, and a germ fraction. The germ fraction is processed by toasting and grinding and preferably by removing bran before the toasting. The bran fraction and any bran material separated out from the ground germ is modified to increase its functionality by high temperature, high shear extrusion in a counter-rotating twin screw extruder. The endosperm fraction is coarsely milled, made into a slurry, cooked and then enzymatically hydrolyzed. The final step involves recombining the processed fractions, to form a cereal dough which is further processed to produce a ready-to-eat breakfast cereal. Optionally from 1–15% of the whole grain may be malted and added into the cereal dough.

26 Claims, No Drawings

ALL NATURAL, READY-TO-EAT ENZYME-SACCHARIFIED CEREAL DERIVED FROM WHOLE CEREAL GRAIN

TECHNICAL FIELD

This invention relates to a novel breakfast cereal and process for producing same. More specifically, it relates to a sweet, all natural, enzymesaccharified, high fiber cereal derived from a whole cereal grain.

BACKGROUND ART

Processes involving the enzymatic hydrolysis of starch to form monosaccharides, disaccharides, trisaccharides, and oligosaccharides are commonly known to the skilled food artisan. U.S. Pat. No. 4,254,150 issued to Fritze et al. entitled Process For Producing a Foodstuff of Cereal teaches a process to saccharify the starch contained in the cereal to form dextrose by enzymatic degradation of the starch in the cereal grain. In this enzymatic process, all the cereal substances, both those containing starch and those not containing starch are treated together. The foodstuff produced according to this invention is claimed to have a good flavor and the dextrose content thereof is absorbed directly as sugar by the body. While such a process will saccharify the starch content of the cereal grain it is difficult to produce a cereal dough of sufficient functionality because the starch which has been saccharified is no longer present in a sufficient quantity to provide the typical matrix forming properties contributed by the endosperm.

U.S. Pat. No. 4,282,319 issued to Conrad, teaches a process for preparing in situ, enzymatically hydrolyzed protein and starch products from whole grain comprising crushing the grain, enzymatically treating the crushed grain with first an endopeptidase to transform substantially all water-soluble proteins to peptides and subjecting the remainder of the crushed grain to a starch enzymatic hydrolysis and preferably separating out the bran upon completion of the aforementioned treatments.

U.S. Pat. No. 2,289,416 issued to Fine, et al. teaches a process for preparing a cereal from whole grain comprising rupturing the bran coat of the kernels, gelatinizing the starch and then treating the gelatinized starch with a starch splitting enzyme to convert the majority of the starch to dextrins and sugars. After the treatment has been completed (in approximately 2 hours at 60°-70° C.) the converted grain is heated to inactivate the enzyme, dried, tempered and processed to produce a toasted product in flaked, shredded or other desired form.

It is therefore an object of the present invention to hydrolyze polysaccharides and starches present in the cereal grain to effect substantial sweetness in the final cereal product. Another object of the present invention is a process to obtain a self-sweetened food product especially a ready-to-eat breakfast cereal without the addition of sugars.

It is also an object of the present invention to increase the moisture absorption, organoleptic qualities, palatability and texture forming properties of the bran component of the cereal grain to replace the matrix forming properties of the endosperm lost as a result of the in situ conversion of starch. In a like manner, the protein component present within the germ fraction of the whole grain, after functional modification, is utilized in the present invention to matrix the grain syrup which results from the saccharification of starch.

It is an additional object of the present invention to supply a ready-to-eat cereal product containing an increased level of dietary fiber, as compared to typical breakfast cereals.

DISCLOSURE OF THE INVENTION

The present invention involves a new process to produce a sweet, all natural, enzyme-saccharified, cereal derived from a whole cereal grain.

The starting material for this process is the whole cereal grain which is then subsequently milled and separated to produce a bran fraction, an endosperm fraction and a germ fraction. Optionally, the cereal grain fractions may be obtained from suppliers and utilized in the same proportion as present in the whole cereal grain and processed according to this invention. Each of the three components undergo separate treatments and are recombined to form a cereal dough such that all three fractions are present in the same ratio as present in the starting whole grain.

The germ fraction which contains a high level of high quality protein but which also contains a major amount of bran and oil is toasted and comminuted for optimum matrix performance and shelf stability. The germ is toasted at from 110° C. to 160° C., preferably from 130° C. to 155° C. for 15 to 175 minutes, preferably from 20 to 30 minutes and then the toasted germ is ground to an average particle size of from 0.25 to 2.0 millimeters. If ground too fine, the bran-free germ will develop off-flavors. Optionally, before the germ is toasted, any bran material present therein is separated out (i.e. by air classification) and is combined with the bran fraction of the cereal grain.

The bran fraction either alone or combined with the bran material which was separated out from the ground germ (if that optional embodiment is utilized) must be treated to improve its functionality. The bran modification is essential to the invention because if the majority of the starch-containing endosperm is saccharified, another ingredient must then replace the starch as the matrix of the cereal. The bran modification process will produce a bran material which is functional and will possess increased texture-forming properties. Also the modified bran will not have the gritty mouthfeel characteristic of conventional bran containing cereals.

The bran modification method involves modification by extrusion which involves forming a bran and water feed having a bran to water ratio from 5.5:1 to 10:1 and extruding the feed in a counter-rotating twin screw extruder under high temperature and high shear conditions to produce a bran which will be more readily millable. It was determined that effective shear rates in the maximum shear zone for this bran modification method range from a minimum of approximately 500 seconds$^{-1}$ to a maximum of approximately 2,000 seconds$^{-1}$. The bran is subjected to a temperature of from 150° C. to 180° C. in the extruder. The bran which is introduced into the extruder must contain from 10% to 25% starch on a dry weight basis. The starch may be either naturally present in the bran or may be admixed therewith. The modified bran is then milled, preferably in a conventional foodmill. The commonly-assigned, co-pending U.S. patent application Ser. No. 611,651, filed on May 18, 1984 now U.S. Pat. No. 4,500,558 issued on Feb. 19, 1985, entitled "Modification Of Bran By Extrusion" discusses in more detail this process and the attributes of the modified bran thus produced. This application is herein incorporated by reference.

The endosperm fraction which consists essentially of starch, is milled to a particle size less than 2 millimeters for optimal water, heat and enzyme penetration. The milled endosperm, 15 to 60% by weight in a slurry, is cooked by any suitable means until substantially all the starch is gelatinized and then enzymatically hydrolyzed to form soluble saccharides. From 15 to 75% by weight of the endosperm is enzymatically hydrolyzed, preferably from 50 to 60%. The soluble saccharide produced is preferably glucose. The endosperm fraction is enzymatically saccharified until from 7.5 parts sucrose-equivalent sweetness to 50 parts sucrose-equivalent sweetness is present in the final breakfast cereal product, as consumed. Preferably, the endosperm fraction is enzymatically saccharified until from 10 parts sucrose-equivalent sweetness to 45 parts sucrose-equivalent sweetness is present, and most preferably until from 35 parts sucrose-equivalent sweetness to 40 parts sucrose-equivalent sweetness is present in the final breakfast cereal product, as consumed.

The endosperm fraction after milling can be cooked in a number of different ways to effect the substantial gelatinization of the starch present therein. The starch gelatinization of the endosperm fraction may be accomplished by steam injection in a jet cooker at from 140° to 165° C. in the presence of a thermally stable α-amylase for a period of time varying from one second to 60 seconds. The starch gelatinization may also be accomplished by cooking in a pressurized chamber, such as an autoclave or a rotary cooker at 100° to 140° C. for 5 to 60 minutes with or without the addition of a thermally stable α-amylase. Also the dry endosperm starch may be slurried and gelatinized by heating to 110° to 160° C. in an extruder and then diluted further to give the 15 to 60% by weight concentration of the endosperm prior to enzymatic hydrolysis.

A cereal dough is then obtained by combining the converted ingredients, namely the toasted germ, the modified bran and the enzymatically hydrolyzed endosperm such that the dough contains whole grain levels of protein, fiber and digestible carbohydrates. The cereal dough can be further processed using typical breakfast cereal manufacturing techniques to obtain a ready-to-eat breakfast cereal.

An optional modification of the process involves malting an amount of whole grain equivalent to 1-15% of the starting material, milling the malted grain to a flour consistency, and combining malted grain flour with the converted grain fractions. Preferably, bran material is separated from the milled malted grain prior to the addition of the malted grain to the cereal dough. The bran material which is separated out is added to the bran fraction of the cereal grain to be processed therewith. The best results were observed, when the malt flour was added to the saccharified endosperm, bran and germ before the final cereal dough product was formed.

In food applications where the oil contained within the germ fraction is not desirable in the final product, such as in a cereal designed to be predominately fat-free, the oil contained within the germ fraction may be separated out by solvent extraction or expulsion prior to toasting.

Alternately, the germ can be separated from the bran fragments preferably by air classification and the full fat germ particles are then bumped, dehydrated and/or toasted. This treatment, by basically maintaining the oil droplets in the natural cell environment, encapsulated by the cell matter that contains desirable natural antioxidants, can result in full fat germ particles with suitable shelf stability in the finished cereal product.

The protein contained within the germ fraction is a useful, functional ingredient which replaces some of the lost functional properties attributable to the starch. The protein acts in its texture promoting role by matrixing with the endosperm syrup. The protein will matrix with the syrup best when the oil content of the germ has been removed prior to the formation of the cereal dough.

While the hydrolysis of the polysaccharides can be obtained by a variety of enzymes and processes, the preferred process consists of a 1 to 4 hour treatment of cooked or uncooked grain endosperm fractions at 18 to 55% solids. A dual enzymatic reaction involving bacterial α-amylase simultaneously with a fungal glucoamylase is preferred. A pH of from 4.5 to 6.0, preferably 4.8 to 5.2 is utilized and the temperature range will vary from approximately 40°–75° C., preferably from 55° to 70° C.

It is possible to vary the level of sweetness by controlling either the solids concentration or the amount of the incorporated saccharide into the final cereal dough. Additionally, the total sweetness of the cereal product can be controlled by either limiting the enzyme reaction on the starch of the endosperm or by not saccharifying an aliquot of the endosperm fraction. It is not desirable to separate the sweet liquid obtained by the hydrolysis of the endosperm fraction from the residual solids. The residual unreacted endosperm structure, if not physically disrupted by separation, is beneficial in aiding in matrix formation. Additional advantages of this process include the fact that the conversion takes place fairly rapidly and the reaction may take place within a single vessel.

Appropriate cereal grains which may be utilized in conjunction with the present invention include corn, wheat, oat, barley, buckwheat, rye, rice, sorghum, and millet.

Since the endosperm contains in excess of 95% of the starch present in the whole grain, it is the only fraction of the whole grain which undergoes enzymatic treatment. Since there is only a low level of the starch component within the malted grain, it is not generally regarded to be economically worthwhile to subject the malt flour to enzymatic treatment. However, the malt flour could be added to the endosperm before gelatinization and saccharification to convert the residual starch in the malt flour into sugar. It is undesirable to treat the germ or fiber fraction enzymatically because off-flavors may develop. The process of the present invention will not produce any off-flavors because the endosperm is enzymatically saccharified separately.

To achieve optimum product quality, some food ingredients which were not necessarily treated for sweetness or fiber functionality, i.e. cereal products like rolled oats or buckwheat can be added for flavor, texture advantage or for ease of process conversion. Other untreated ingredients can also be included, i.e. nuts, raisins, honey, etc. for product desirability.

While it is anticipated that the inventive process will have its greatest utilization in the area of the production of ready-to-eat breakfast cereals, other logical product applications other than breakfast cereals would include but not be limited to snack food items, baby foods, main meal items, side dishes, desserts, cake ingredients and as a pet food or pet food ingredient.

The converted ingredients which make up the cereal dough can be further processed using typical breakfast cereal manufacturing techniques, singly, in groupings or in sequences to obtain a marketable ready-to-eat cereal product. In a simple and convenient way, the converted ingredients (modified bran, germ, malt and saccharified endosperm) were combined and dried/toasted on steam drying rolls at a moderately high temperature (approximately 150° C.). This process step reduced the thick slurry of the combined materials into a malty, pleasant tasting, crisp eating, cereal material. When consumed with milk, the flaky cereal as obtained from the drying rolls retained a remarkable crispness in the fluid. Considering the high simple sugar content, this was surprising and unexpected and was found to be due to the presence of the modified fibers of the bran without which the cereal would rapidly developed a limp texture that would soon disintegrate in the milk.

The heat, (for example, of the steam drying rolls) was instrumental in developing a desirable composite flavor where the cereal flavor inherent particularly in the bran the nutty flavor of the germ, the sweetness and flavor of the saccharified endosperm and the toasted flavor of the malt combined into a pleasant and high flavor level.

The recombined, converted grain components which make up the cereal dough could be processed into a ready-to-eat cereal several other conventional ways including but not limited to the following methods:

(1) Partially drying the materials of the combined ingredients to a doughy consistency. Forming, extruding the material into pellets on equipment like Buhler or Ambretti extruders, drying the pellets to a yet lower moisture level, flaking the pellets (e.g., on a non-differential flaking mill), and toasting the flakes to a desirable flavor.

(2) Reducing the moisture level of the material to a doughy consistency and forming shapes of choice on a cookie cutter using known techniques followed by toasting the particles.

(3) It is even possible that if the total conversion of the starch of the grain for sweetness is not necessary, an endosperm or starch fraction of the unsaccharified portion of the grain could be recombined with the converted grain fractions, and the material expanded by one of several known techniques.

The invention is further illustrated, but not limited by the following examples:

EXAMPLE 1

An all corn cereal was prepared according to the following procedure. Corn grain was divided into two portions, the major proportion (95%) was coarsely milled and separated into endosperm, germ and primary bran fractions. The other portion, 5%, was malted as described later in the example. The endosperm fraction (brewers grits size—2mm diameter) was slurried at 20% w/w in water and cooked at 121° C. for 30 minutes. Part of the cooked endosperm was saccharified as follows. The pH was adjusted to 5.0 with 3N HCl, the $Ca^{++}$ level of the solution was brought to 330ppm and the temperature was controlled at 60° C. Then α-amylase, Novo Termamyl T-60 (1.6 ml/kg endosperm) and glucoamylase Miles Diazyme L-100 (6.6 ml/kg endosperm) were added to the stirred slurry. After 2 hours of reaction, 65% of the endosperm weight had been converted to glucose.

The germ fraction underwent air classification to separate out bran material. The bran-free germ fraction with the oil content intact was toasted at 150° C. for 30 minutes and ground to 10 U.S. Standard Screen (approximately 2.0 mm).

The primary bran fraction and the bran material removed from the germ fraction was modified by extrusion in a Welding Engineers counter-rotating twin screw extruder in the manner taught by co-pending U.S. patent application Ser. No. 611,651 filed May 18, 1984. The following conditions were utilized: feed rate 200 lb/hr., water rate 18 lb/hr., screw rpm 275, 50 amps, H.P 20, maximum temperature in the barrel 165° C. and a bran:water ratio of the feed of 7:1. The extrudate obtained was ground in a Homoloid Fitzmill.

The corn malt was prepared according to the following malting process. A thin layer of seed corn was placed on wire mesh screens. Two shelves of the screens were inserted in an enclosed dark chamber with air flow. The corn was sprouted in the chamber with a two second blast of 24° C. $H_2O$ in every 5 minutes through a wide angle nozzle. The corn was harvested after 72 hours of sprouting. At this time, the sprouted corn had 1½-2" long sprouts and roots. The sprouted corn has 2.6% (dry base) of reducing sugar, while the non-sprouted corn contains only 0.7%. The sprouted corn was dried in an air-oven at 149° C. (300° F.) for 45 minutes. The drying process increased the reducing sugar content to 8–9% and developed an excellent corn malt flavor. The dried corn was ground to 20 mesh particle size.

A ready-to-eat breakfast cereal was prepared by combining the saccharified endosperm and cooked endosperm to give the level of sweetness desired; adding the malt, germ and bran fractions then drying the slurry on steam rolls at 149° C. (300° F.) at 4 rpm. The final dry weight composition of the flakes was 73.5% endosperm (at least 37% was saccharified endosperm fraction), 10.5% extruded bran fraction, 10.5% toasted full-fat germ fraction, 5% corn malt and 0.5% salt.

We claim:

1. A process for preparing an enzyme-saccharified ready-to-eat cereal derived from a whole cereal grain comprising:
   (a) milling and separating a whole cereal grain to produce a germ fractioin, a bran fraction and an endosperm fraction;
   (b) processing the germ fraction by:
      (i) toasting the germ fraction, and
      (ii) grinding the toasted germ to a particle size of from 0.25 to 2.0 millimeters;
   (c) modifying the bran fraction to improve its functionality by high temperature, high shear extrusion in a counter-rotating twin screw extruder by a process which comprises:
      (i) combining bran with water to form a feed having a bran to water ratio of from 5.5:1 to 10:1, said bran containing from 10% to 25% starch on a dry weight basis, said starch either being naturally present in the said bran or admixed therewith;
      (ii) introducing the feed into a counter-rotating twin screw extruder;
      (iii) extruding the feed at a temperature of from 150° C. to 180° C.; and
      (iv) developing a shear rate of from 500 to 2,000 seconds$^{-1}$ in said extruder through which the said feed is extruded;

(d) processing the endosperm fraction by:
  (i) milling to a particle size less than 2 millimeters,
  (ii) forming a slurry containing from 15 to 60% by weight of said milled endosperm,
  (iii) cooking the milled endosperm until substantially all the starch is gelatinized, and
  (iv) enzymatically hydrolyzing from 15 to 75% by weight of said endosperm to form soluble saccharides such that the ready-to-eat cereal contains from 7.5 parts sucrose-equivalent sweetness up to 50 parts sucrose-equivalent sweetness;
(e) recombining the ground, toasted germ of step (b)(ii), the modified bran of step (c) and the enzymatically hydrolyzed endosperm of step (d)(iv) to form a cereal dough containing whole grain levels of protein, fiber and digestible carbohydrates;
(f) obtaining a ready-to-eat cereal from said cereal dough.

2. The process according to claim 1 wherein the whole grain is corn, wheat, oats, barley, rye, buckwheat, rice, sorghum, or millet.

3. The process according to claim 1 additionally comprising the steps of:
  (a) malting an amount of whole grain equivalent to 1 to 15% of the whole cereal grain;
  (b) milling the malted grain to a flour consistency; and
  (c) adding said malted grain flour to the cereal dough of claim 1, step (e).

4. The process of claim 1 wherein the enzymatic hydrolysis of the endosperm comprises a treatment process whereby the endosperm at a 18–55% solids content is subjected to the enzymatic action of α-amylase simultaneously with fungal glucoamylase at a pH of from 4.5 to 6 at a temperature of 40° to 75° C. for 1 to 4 hours.

5. The process of claim 4 wherein the pH is from 4.8 to 5.2 and the temperature is from 55° to 70° C.

6. The process according to claim 1 wherein oil contained within the germ fraction is separated out by extraction or expulsion prior to toasting.

7. The process according to claim 1 wherein the germ fraction is toasted at a temperature of from 110° C. to 160° C. for 15 to 175 minutes.

8. The process according to claim 7 wherein the germ fraction is toasted at a temperature of from 130° C. to 155° C. for 20 to 30 minutes.

9. The process of claim 1 wherein the germ fraction is first processed by separating bran material out of said fraction prior to toasting, said bran material additionally being added to the bran fraction of claim 1 step (c) to be processed therewith.

10. The process of claim 3 wherein bran material is separated from the milled malted grain prior to the addition of the malted grain to the cereal dough, said bran material additionally being added to the bran fraction of claim 1 step (c) to be processed therewith.

11. The process of claim 1 wherein the ready-to-eat cereal contains from 10 parts sucrose-equivalent sweetness to 45 parts sucrose-equivalent sweetness.

12. The process of claim 11 wherein the ready-to-eat cereal contains from 35 parts sucrose-equivalent sweetness to 40 parts sucrose-equivalent sweetness.

13. The product produced by the process of claim 1.

14. A process for preparing an enzyme-saccharified ready-to-eat cereal derived from whole cereal grain fractions, said fractions comprising a germ fraction, a bran fraction and an endosperm fraction, all of said fractions being derived from a cereal grain, said fractions being present in the same proportions as present in the whole cereal grain, said process comprising:
  (a) processing the germ fraction by:
    (i) toasting the germ fraction, and
    (ii) grinding the toasted germ to a particle size of from 0.25 to 2.0 millimeters;
  (b) modifying the bran fraction to improve its functionality by high temperature, high shear extrusion in a counter-rotating twin screw extruder by a process which comprises:
    (i) combining bran with water to form a feed having a bran to water ratio of from 5.5:1 to 10:1, said bran containing from 10% to 25% starch on a dry weight basis, said starch either being naturally present in the said bran or admixed therewith;
    (ii) introducing the feed into a counter-rotating twin screw extruder,
    (iii) extruding the feed at a temperature of from 150° C. to 180° C.; and
    (iv) developing a shear rate of from 500 to 2,000 seconds$^{-1}$ in said extruder through which the said feed is extruded;
  (c) processing the endosperm fraction by:
    (i) milling to a particle size less than 2 millimeters,
    (ii) forming a slurry containing from 15 to 60% by weight of said milled endosperm,
    (iii) cooking the milled endosperm until substantially all the starch is gelatinized, and
    (iv) enzymatically hydrolyzing from 15 to 75% by weight of said endosperm to form soluble saccharides such that the ready-to-eat cereal contains from 7.5 part sucrose-equivalent sweetness up to 50 parts sucrose-equivalent sweetness;
  (d) recombining the ground, toasted germ of step (a)(ii), the modified bran of step (b) and the enzymatically hydrolyzed endosperm of step (c)(iv) to form a cereal dough containing whole grain levels of protein, fiber and digestible carbohydrates;
  (e) obtaining a ready-to-eat breakfast cereal from said cereal dough.

15. The process according to claim 14 wherein the whole grain is corn, wheat, oats, barley, rye, buckwheat, rice, sorghum, or millet.

16. The process according to claim 14 additionally comprising the steps of:
  (a) malting an amount of whole grain fractions equivalent to 1 to 15% of the whole cereal grain;
  (b) milling the malted grain to a flour consistency; and
  (c) adding said malted grain flour to the cereal dough of claim 15, step (d).

17. The process of claim 14 wherein the enzymatic hydrolysis of the endosperm comprises a treatment process whereby the endosperm at a 18–55% solids content is subjected to the enzymatic action of α-amylase simultaneously with fungal glucoamylase at a pH of from 4.5 to 6 at a temperature of 40° to 75° C. for 1 to 4 hours.

18. The process of claim 17 wherein the pH is from 4.8 to 5.2 and the temperature is from 55° to 70° C.

19. The process according to claim 14 wherein oil contained within the germ fraction is separated out by extraction or expulsion prior to toasting.

20. The process according to claim 14 wherein the germ fraction is toasted at a temperature of from 110° C. to 160° C. for 15 to 175 minutes.

21. The process according to claim 20 wherein the germ fraction is toasted at a temperature of from 130° C. to 155° C. for 20 to 30 minutes.

22. The process of claim 14 wherein the germ fraction is first processed by separating bran material out of said fraction prior to toasting, said bran material additionally being added to the bran fraction of claim 14 step (b) to be processed therewith.

23. The process of claim 16 wherein the bran material is separated from the milled malted grain prior to the addition of the malted grain to the cereal dough, said bran material additionally being added to the bran fraction of claim 14 step (b) to be processed therewith.

24. The process of claim 14 wherein the ready-to-eat cereal contains from 10 parts sucrose-equivalent sweetness to 45 parts sucrose-equivalent sweetness.

25. The process of claim 24 wherein the ready-to-eat cereal contains from 35 parts sucrose-equivalent sweetness to 40 parts sucrose-equivalent sweetness.

26. The produce produced by the process of claim 14.

* * * * *